United States Patent
Valleroy et al.

(10) Patent No.: US 9,027,884 B2
(45) Date of Patent: May 12, 2015

(54) METHOD FOR MAKING A NACELLE DE-ICING ELEMENT

(75) Inventors: Laurent Georges Valleroy, Le Havre (FR); Marc Gerome, Le Havre (FR)

(73) Assignee: Aircelle, Gonfreville l'Orcher (FR)

( * ) Notice: Subject to any disclaimer, the term of this patent is extended or adjusted under 35 U.S.C. 154(b) by 625 days.

(21) Appl. No.: 13/062,000

(22) PCT Filed: Aug. 14, 2009

(86) PCT No.: PCT/FR2009/001008
§ 371 (c)(1),
(2), (4) Date: Mar. 3, 2011

(87) PCT Pub. No.: WO2010/026304
PCT Pub. Date: Mar. 11, 2010

(65) Prior Publication Data
US 2011/0162340 A1    Jul. 7, 2011

(30) Foreign Application Priority Data
Sep. 3, 2008  (FR) ...................................... 08 04824

(51) Int. Cl.
| | |
|---|---|
| *B64D 15/12* | (2006.01) |
| *B64D 33/02* | (2006.01) |
| *F02C 7/047* | (2006.01) |
| *H05B 3/26* | (2006.01) |
| *H05B 3/28* | (2006.01) |

(52) U.S. Cl.
CPC ................ *B64D 33/02* (2013.01); *F02C 7/047* (2013.01); *H05B 3/267* (2013.01); *H05B 3/286* (2013.01); *B64D 2033/0233* (2013.01); *F05C 2201/0466* (2013.01); *Y02T 50/672* (2013.01); *F05D 2300/172* (2013.01); *F05D 2300/603* (2013.01); *F05D 2300/614* (2013.01)

(58) Field of Classification Search
USPC ............ 244/1 R, 134 R, 134 A, 134 D, 134 E
See application file for complete search history.

(56) References Cited

U.S. PATENT DOCUMENTS

| | | | | |
|---|---|---|---|---|
| 4,876,178 A | * | 10/1989 | Voss et al. ...................... | 430/314 |
| 5,131,812 A | * | 7/1992 | Boyd et al. ...................... | 416/95 |
| 5,152,480 A | * | 10/1992 | Adams et al. ............. | 244/134 D |
| 5,314,145 A | * | 5/1994 | Rauckhorst, III ......... | 244/134 A |
| 5,429,327 A | * | 7/1995 | Adams ...................... | 244/134 D |
| 5,475,204 A | * | 12/1995 | Giamati et al. ............... | 219/548 |
| 5,590,854 A | * | 1/1997 | Shatz ............................ | 244/206 |
| 6,054,690 A | * | 4/2000 | Petit et al. ..................... | 219/528 |
| 6,250,587 B1 | * | 6/2001 | Schramm et al. ......... | 244/134 R |

(Continued)

FOREIGN PATENT DOCUMENTS

| | | |
|---|---|---|
| EP | 1826119 | 8/2007 |
| GB | 885131 | 12/1961 |

OTHER PUBLICATIONS

International Search Report; PCT/FR2009/001008; Dec. 22, 2009.

*Primary Examiner* — Benjamin P Lee
(74) *Attorney, Agent, or Firm* — Brinks Gilson & Lione

(57) ABSTRACT

The invention relates to a method for making a nacelle element (2) that includes the steps of: (A) forming an array of heating resistors on a substrate using a photolithographic method; (B) applying a web (50, 52) of composite materials onto the array obtained in step (A); (C) applying an inner skin (12) onto the de-icing assembly (13) thus obtained. The invention also relates to a nacelle including such an element (2).

17 Claims, 3 Drawing Sheets

(56) References Cited

U.S. PATENT DOCUMENTS

| | | | |
|---|---|---|---|
| 6,352,601 B1 * | 3/2002 | Ray | 156/71 |
| 6,457,676 B1 * | 10/2002 | Breer et al. | 244/134 R |
| RE38,024 E * | 3/2003 | Adams et al. | 244/134 D |
| 7,291,815 B2 * | 11/2007 | Hubert et al. | 219/535 |
| 7,629,558 B2 * | 12/2009 | Petrenko | 219/492 |
| 7,923,668 B2 * | 4/2011 | Layland et al. | 219/535 |
| 2004/0245395 A1 * | 12/2004 | Wallace | 244/134 R |
| 2008/0179448 A1 | 7/2008 | Layland et al. | |
| 2010/0196660 A1 * | 8/2010 | Dressler | 428/138 |
| 2011/0024568 A1 * | 2/2011 | Bardwell | 244/134 D |
| 2011/0155855 A1 * | 6/2011 | Caruel | 244/134 D |

* cited by examiner

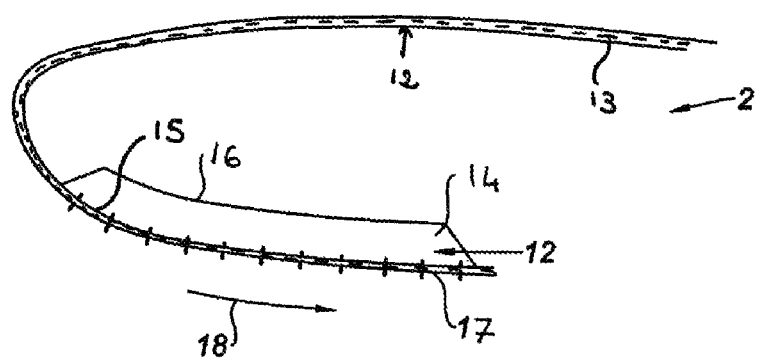
Fig. 2
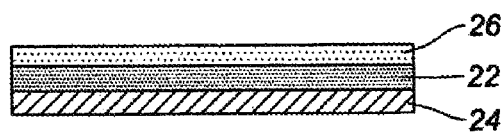
Fig. 3
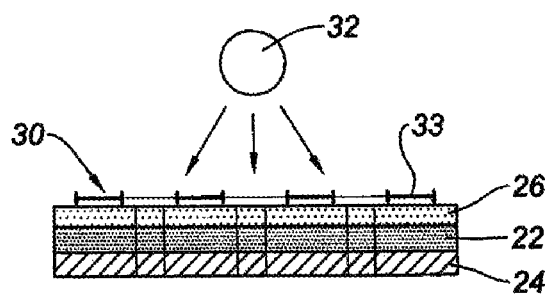
Fig. 4
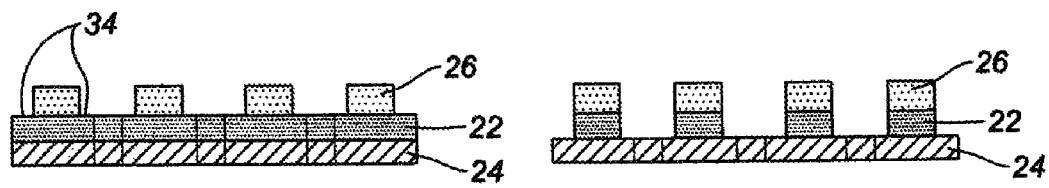
Fig. 5
Fig. 6

METHOD FOR MAKING A NACELLE DE-ICING ELEMENT

TECHNICAL FIELD

The invention relates to a method for making an element including a de-icing device.

The invention also relates to a turbojet nacelle comprising such an element.

BACKGROUND

An airplane is propelled by one or several propulsive assemblies each comprising a turbojet engine housed in a tubular nacelle. Each propulsive assembly is attached to an aircraft by a mast situated under a wing or at the fuselage.

A nacelle generally has a structure comprising an air intake upstream of the engine and a middle section able to surround a fan of the turbojet engine, a downstream section generally housing thrust reverser means and able to surround the combustion chamber of the turbojet engine. The nacelle typically ends with an ejection nozzle, the outlet of which is situated downstream of the turbojet engine.

The air intake comprises, on one hand, an intake lip adapted to allow optimal collection towards the turbojet engine of the air necessary to supply the fan and the internal compressors of the turbojet engine, and on the other hand, a downstream structure, on which the lip is attached, intended to suitably channel the air towards the blades of the fan. The assembly is attached upstream of a case of the fan belonging to the upstream section of the nacelle.

In flight, depending on the temperature and moisture conditions, ice can form on the nacelle in various places including the outer surface of the air intake lip. The presence of ice or frost modifies the aerodynamic properties of the air intake and disturbs the conveyance of the air towards the fan.

One solution for de-frosting or de-icing the nacelle, in particular the outer surface of the air intake lip, consists of preventing ice from forming on the wall by heating the latter parts using an electric heating resistor. The heating resistor is typically mounted on or in the outer wall of an element to be de-iced, for example in the case where the heating resistors are in the form of leaves.

However, such an element is difficult to manufacture due to the geometry of the wall. Indeed, the de-icing device must not interfere with other performance by the element of the nacelle such as absorption of the noises generated by the operation of the turbojet engine. In particular, the heating resistor must not interfere with the holes therein, for example by blocking said holes.

In the case where the electric resistor is in the form of leaves and in the case where the acoustic holes were made first, the placement of said leaves around the acoustic holes is difficult. In the case where the resistive leaves are placed first, the perforation of said leaves to obtain acoustic holes damages the acoustic resistor.

Moreover, the heating resistors of the prior art are generally integrated manually on composite supports. Because of this, making these resistors is lengthy and complex.

Moreover, the manufacturing limits and location of the heating resistors vary depending on the operators.

BRIEF SUMMARY

One aim of the present invention is therefore to provide an air intake lip not having the aforementioned drawbacks.

To that end, according to a first aspect, the invention relates to a method for making a nacelle element that includes the steps of:

A. forming an array of heating resistors on a substrate using a photolithographic method;

B. applying a web of composite materials onto the array obtained in step A;

C. applying an inner skin onto the de-icing assembly thus obtained.

The method according to the invention advantageously makes it possible to simply and effectively make an element capable of being de-iced.

Moreover, the method according to the invention has a number of steps limiting the manual operations.

In the case where the element comprises an acoustic treatment, in particular in the form of acoustic holes, the method according to the invention advantageously makes it possible to precisely position the acoustic holes relative to the conductive elements. Thus, the insulation distance of the heating resistors and their electrical power with said holes is advantageously respected, which guarantees good operation of de-icing assembly.

Contrary to the case where the electric resistor assumes the form of leaves juxtaposed next to each other, the placement of the resistor relative to the acoustic holes is more precise with the method according to the invention and no piercing of said resistor is necessary.

According to other features of the invention, the structure of the invention includes one or several of the following optional features considered alone or according to all possible combinations;

- step B is a step in which said array obtained at the end of step A is inserted into the webs of composite materials;
- the method according to the invention includes a step B1 between steps B and C in which the assembly obtained at the end of step B is pierced with piercing means so as to obtain acoustic holes;
- the inner skin includes a composite layer on which a honeycomb structure is mounted, which makes it possible to absorb the noise annoyances generated by the operation of the turbojet engine;
- the method according to the invention includes a step D in which the de-icing assembly and the composite layer of the inner skin are pierced using a piercing means;
- the composite layer of the inner skin is pierced beforehand in step C;
- the acoustic holes obtained have a diameter between 0.2 mm and 2.5 mm, which ensures good sound absorption and good structural resistance;
- before step B, an electric power array is made on the face opposite the face of the substrate including the array of heating resistors that makes it possible to provide the heating resistor array with electricity;
- the power array is connected to the heating resistor array via a connection means passing through the substrate, which makes it possible to avoid adding electrical wires;
- the power array comprises a metal or an alloy whereof the ambient temperature resistivity is equal to about 1.7 $\mu\Omega \cdot cm$;
- the heating resistors comprise a metal or alloy with a resistivity between 0.000 24 $\Omega \cdot mm$ and 0.002 $\Omega \cdot mm$, which makes it possible to obtain good de-icing of the element according to the invention while using the smallest amount of electric energy;
- the alloy of the heating resistors is chosen from alloys of copper and nickel;

the substrate is manufactured from glass fibers, epoxy resin, or a thermoplastic insulating film;

each web comprises a material of the glass fiber type associated with a thermoduric or thermoplastic resin;

during step A, the substrate is substantially flat;

before step C, the surface of the de-icing assembly is cut such that the maximum gap between the de-icing assembly and the inner skin is in the vicinity of 1.7 mm, which allows a good configuration of the de-icing assembly;

at the end of step B or C, a surface coating is applied on the de-icing assembly, which makes it possible to meet aerodynamic, erosion, and lightning protection constraints.

According to a second aspect, the invention relates to a turbojet engine nacelle including an element obtained using the method according to the invention. Preferably, the element according to the invention is an air intake lip, which is an element of the nacelle particularly sensitive to the deposition of frost or ice.

BRIEF DESCRIPTION OF THE DRAWINGS

The invention will be better understood upon reading the following non-limiting description, done in reference to the appended figures.

FIG. 2 is a transverse diagrammatic cross-section of an example of an element according to the invention;

FIGS. 3 to 7 are a partial transverse cross-section of a de-icing assembly obtained using the method according to the invention;

DETAILED DESCRIPTION

Figure 1:
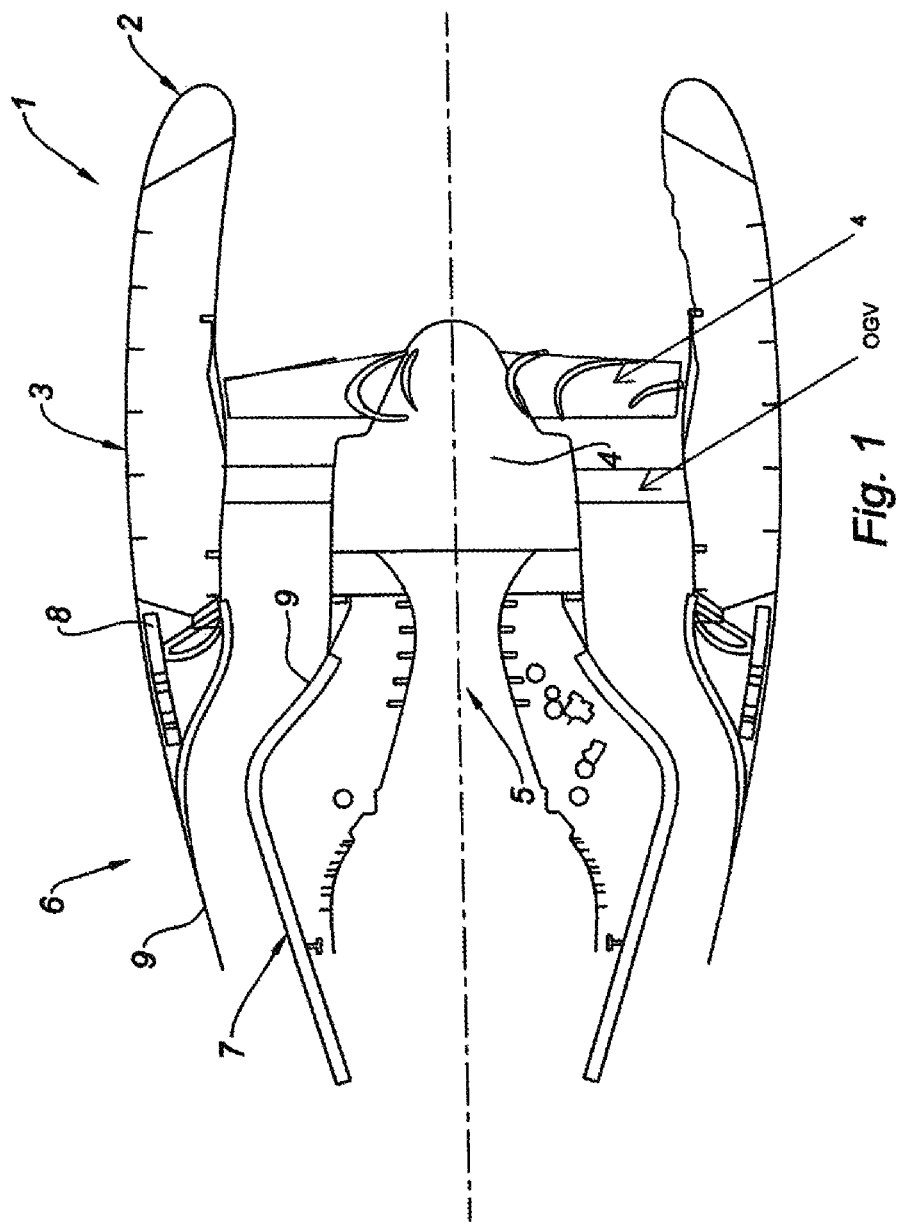
FIG. 1 is a transverse diagrammatic cross-section of a nacelle according to the invention surrounding a turbojet engine.

As shown in FIG. 1, a nacelle 1 according to the invention comprises an air intake lip 2, a middle structure 3 surrounding a fan 4 of a turbojet engine 5, and a downstream assembly 6. The downstream assembly 6 is made up of an inner fixed structure (IFS) 7 surrounding the upstream portion of the turbojet engine 5, an outer fixed structure (OFS) 8, and a mobile cowling 9 including a thrust reverser means.

The element according to the invention can be an air intake lip that is an element of the nacelle particularly sensitive to the deposition of ice and frost (see FIG. 2). It is also possible to use the method according to the invention to make any surface needing to be de-iced, such as helicopter or aircraft ducts, or the exposed areas of a turbojet engine such as the fan blades, the arms passing through the air flow such as OGVs, . . . .

This method is applicable to a composite structure, whether it is monolithic, self-stiffened, or sandwiched, in order to meet the thermal efficiently, structural resistance, etc., constraints.

In the embodiment shown in FIG. 2, the air intake lip 2 of the invention includes an inner skin 12 mounted on a de-icing assembly 13 capable of de-frosting and de-icing the air intake lip 2. The inner skin 12 can include, in certain zones, an acoustic panel in order to absorb the noise annoyances due to the operation of the turbojet engine 5. The acoustic panel includes a honeycomb structure 14 sandwiched between a composite layer 15 pierced with multiple acoustic holes and a solid outer layer 16, i.e. not having a multitude of acoustic holes. The composite layer 15 tops the de-icing assembly 13.

The de-icing assembly 13 can also be coated on another face with a surface coating 17 making it possible to protect said face from erosion and any impacts. The de-icing assembly 13, if applicable the surface coating 17, is in contact with the cold air flow 18, which is not the case for the inner skin 12.

In other zones of the air intake lip 2 according to the invention, the inner skin 12 is a non-acoustic structural skin, i.e. including a honeycomb structure without acoustic holes. It is also possible for the inner skin 12 not to be structural, but only a non-acoustic composite layer.

The air intake lip 2 is obtained using the method according to the invention comprising the following steps:

A. an array of heating resistors is formed on a substrate using a photolithographic method;

B. the array obtained in step A is inserted in webs of composite materials;

C. an inner skin 12 is applied onto the de-icing assembly thus obtained.

The method according to the invention simply provides an effective de-icing assembly. The de-icing assembly can advantageously be made beforehand or at the same time as the implementation of the air intake lip 2.

The method according to the invention offers a possibility of fairly varied array geometry. As a result, it is possible to precisely choose the shape of the pattern of the array so as to have optimal de-icing depending on the needs.

Moreover, the method according to the invention ensures precise positioning of the heating resistor array. Such precision of the position of the array is advantageous when the de-icing assembly is intended to be fastened on an acoustic structure.

As shown in FIGS. 3 to 7, in step A, an array of heating resistors 20 is made on a substrate 24 using a photolithography method. According to one preferred embodiment, the substrate 24 is substantially planar, which makes it possible to further simplify the implementation of the method according to the invention. According to another alternative, it is also possible to apply the photolithography method to a substrate having the form of the air intake lip 2.

To manufacture the heating resistor array, a conductive layer 22 is fastened on the substrate 24 using any means known by those skilled in the art. The fastening can be done using a glue, for example.

The heating resistors 20 comprise a metal or an alloy with a resistivity between 0.0002 Ω·mm and 0.002 Ω·mm, preferably between 0.00024 Ω·mm and 0.002 Ω·mm, or between 0.0004 Ω·mm and 0.001 Ω·mm. As a result, the heating resistors 20 generate a heating power between 1 kW·m$^{-2}$ and 50 kW·m$^{-2}$, in particular between 4 kW·m$^{-2}$ and 20 kW·m$^{-2}$. Such a heating power advantageously makes it possible to unstick any frost or ice formed on the air intake surface 2 while using the smallest amount of electrical energy or prevent the formation of such frost or ice.

In particular, the alloy of the heating resistors 20 is chosen among alloys of copper and nickel, for example constantan (CuNi44).

The substrate 24 is preferably made from glass fibers, epoxy resin or any electrically insulating film such as a thermoplastic film. Examples of epoxy resin include epoxy resin 914®.

On the layer including the heating resistors, a photosensitive layer 26 comprising at least one photosensitive element is mounted on the conductive layer 22. Examples of photosensitive elements include negative resins such as resin SU-8®, for which ultraviolet radiation causes a polymerization of the exposed zones, giving those zones a particular resistance to a revealing solvent while the non-insulated portions disappear selectively in the revealing solvent. Examples include positive resins of the AZ 9260®, S1818® and SJR 5740® resin type, for which the ultraviolet radiation produces a chemical transformation of the macromolecules, which causes increased solubility of the zones exposed in the developer, or reversal resins of the AZ 5214® and T109XR® type, which have the property of changing polarity following a so-called inversion annealing step.

As shown in FIG. 4, a mask 30 is applied above the assembly formed by the substrate 24, the conductive layer 22 and the photosensitive layer 26. The mask includes the pattern 33 of the resistor array.

In order to obtain the desired heating resistor array, the assembly is first insulated using any suitable means 32 known by those skilled in the art. Examples include a UV lamp.

The photosensitive layer 26 protected by the pattern 33 drawn on the mask 30 is not obscured by the UV radiation, which makes it possible to print the pattern on said layer 26. The unprotected photosensitive layer 26 is obscured.

The duration of the insulation varies and depends on the pattern one wishes to etch. Typically, the insulation lasts about 2 min 30 s. In fact, the exposure time of the photosensitive layer 26 must be long enough for the pattern 33 to be printed on said photosensitive layer 26, but short enough to prevent the UV rays from passing through the entire area of the mask 30, thereby erasing any pattern.

The unprotected photosensitive layer 26 is then eliminated using any suitable revealing product known by those skilled in the art.

Because of this, as shown in FIG. 5, the remaining photosensitive layer 26 reproduces the pattern of the desired array.

Any suitable chemical product known by those skilled in the art is then applied in order to eliminate the portion 34 of the conductive layer not situated below the remaining photosensitive layer 26. Thus, as shown in FIG. 6, only the portion of the conductive layer 22 remains that is situated below the pattern formed by the photosensitive layer 26.

Figure 7:
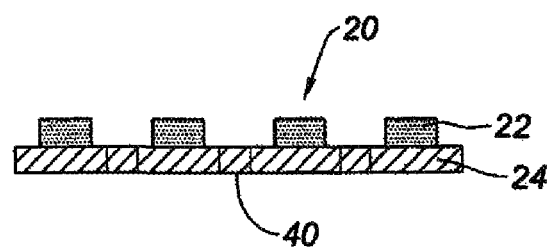

The remaining photosensitive layer 26 is then eliminated using any suitable chemical product known by those skilled in the art such that the conductive layer 22 reveals the pattern of the array 20 of heating resistors (see FIG. 7).

The heating resistors of the conductive layer 22 are generally sensitive to oxidation. Because of this, they can require protection. Thus, in one alternative embodiment of the method, it is possible to provide a step in which the array 20 is oxidized by deposition of an oxide layer, for example by electrolysis.

According to one preferred embodiment that is not shown, before step B, an electrical power array (not shown) is made on the opposite face 40 of the heating resistor array.

The power array can be made using any suitable means known by those skilled in the art, in particular using a photolithography method, as presented above.

The power array is preferably connected to the heating resistor array 20 via a connecting means (not shown) passing through the support 24.

The power array typically comprises a metal or an alloy whereof the resistivity is as low as possible so as to minimize conveyance losses. Preferably, the resistivity of the metal or the alloy is equal to 1.7 $\mu\Omega\cdot cm$. The power array is not intended to release heat, but to conduct the current to the heating resistor array 20. Examples of metal include copper.

Figure 8:
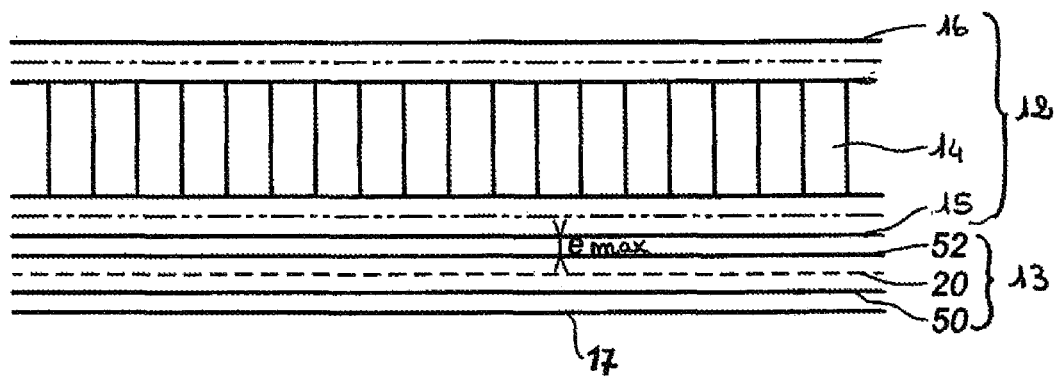
FIG. 8 is a transverse cross-section of an acoustic panel of an element obtained using the method according to the invention.

In step B of the method according to the invention, said array 20 obtained at the end of step A is inserted or encapsulated in webs of composite materials 52 and 50 (see FIG. 8).

In an alternative embodiment of step B, the substrate 24 can be substituted for one of the webs of composite materials 52 or 50. In this case, in step B, a web of composite materials 52 or 50 is applied on the array 20 obtained at the end of step A.

The array 20 will thus be inserted between the substrate 24 on one side and a web of composite material 50 or 52 on the opposite side.

Preferably, each web 50 and 52 comprises a material such as glass fiber associated with a thermoduric resin (Epoxy) or a thermoplastic resin (PEEK). The webs in contact with or close to the electric arrays must electrically isolate them from other electrically conductive components or webs such as epoxy carbon, commonly used for layers 15 transmitting stresses.

The fastening of the array 20 obtained at the end of step A on the web(s) of composite materials 50, 52 can be strengthened using any means known by those skilled in the art, in particular by adhesion.

According to one preferred embodiment, at the end of step B or C, a surface coating 17 is applied that makes it possible to respond to the impacts, and to aerodynamic, erosion, and lightning protection constraints. The surface coating 17 is for example a metal web or a carbon fiber layer. The surface coating 17 is fastened on the de-icing assembly 13 using any suitable means known by those skilled in the art, in particular by adhesion.

In step C of the method according to the invention, the inner skin 12 is applied on the de-icing assembly 13 thus obtained. The inner skin 12 is fastened on the de-icing assembly 13 using any means known by those skilled in the art, in particular by adhesion.

In the case where the inner skin 12 is acoustic, the method according to the invention preferably includes a step B1 between steps B and C in which one pierces the assembly obtained at the end of step B using piercing means so as to obtain acoustic holes with a diameter between 0.2 mm and 2.5 mm, or even between 0.3 and 2 mm. Advantageously, a piercing means is used making it possible to have a precision of the holes in the vicinity of 0.05 mm relative to the heating resistor array 20. Examples of piercing means include a drilling machine, a laser and a water jet.

According to one embodiment, it is interesting that the piercing means recalibrate owing to a radiograph-type camera on a reference test pattern etched during the formation of the heating resistor array 20. A distance between 0.2 mm and 10 mm, or even between 0.5 mm and 1 mm, can be provided between the acoustic holes and the arms of the array 20, so as to guarantee electrical insulation between the resistors and the outside.

Thus, it is possible to obtain both a de-icing assembly 13 that is efficient at de-icing the air intake lip 2, and also better acoustic performance.

According to one preferred embodiment, the method according to the invention includes a step D in which the de-icing assembly 13 and the composite layer 15 of the inner skin 12 are pierced using the piercing means.

According to another embodiment, the composite layer 15 of the inner skin 12 is made and pierced before step C. In other words, the outer skin 15 is pierced before it is placed on the de-icing assembly 13.

According to one preferred embodiment, in the case where the substrate 24 is substantially planar, before step C, the surface of the de-icing assembly 13 is cut out such that the maximum gap emax between the de-icing assembly 13 and the inner skin 12, generally in a non-developable shape, is in the vicinity of 1.7 mm, which allows a good configuration of the de-icing assembly 13, in particular during curing thereof. As a result, the de-icing assembly 13 initially made substantially flat fits the curves of the air intake lip 2.

When the air intake lip 2 is made using the method according to the invention, said lip 2 undergoes curing, the conditions of which are known by those skilled in the art in order to guarantee good cohesion of the assembly.

The air intake lip 2 obtained using the method according to the invention is integrated in the nacelle 1 of an aircraft.

The invention claimed is:

1. A method for making an aircraft nacelle element, comprising:
   A. forming a single layer of an array of heating resistors comprising a metal or alloy with a resistivity between 0.00024 Ω-mm and 0.002 Ω-mm using a photolithographic method;
   B. encapsulating the array between webs of composite materials to form a de-icing assembly for a leading edge of the aircraft nacelle; and
   C. applying an inner skin onto an inner side of the de-icing assembly.

2. The method according to claim 1, further comprising a step B1 between steps B and C in which the assembly obtained at the end of step B is pierced with piercing means so as to obtain acoustic holes.

3. The method according to claim 1, wherein the inner skin includes a composite layer on which a honeycomb structure is mounted.

4. The method according to claim 3, further comprising a step D in which the de-icing assembly and the composite layer of the inner skin are pierced using a piercing means.

5. The method according to claim 3, wherein the composite layer of the inner skin is pierced beforehand in step C.

6. The method according to claim 2, wherein the acoustic holes obtained have a diameter between 0.2 mm and 2.5 mm.

7. The method according to claim 1, wherein, before step B, an electric power array is made on a face opposite to a face of a substrate including the array of heating resistors.

8. The method according to claim 7, wherein the power array is connected to the heating resistor array via a connection means passing through the substrate.

9. The method according to claim 7, wherein the power array comprises a metal or an alloy whereof an ambient temperature resistivity is equal to about 1.7 μΩ·cm.

10. The method according to claim 1, wherein the alloy of the heating resistors comprises at least one of alloys of copper and nickel.

11. The method according to claim 1, wherein the method uses a substrate manufactured from glass fibers, epoxy resin, or a thermoplastic insulating film.

12. The method according to claim 7, wherein, during step A, the substrate is substantially flat.

13. The method according to claim 1, wherein each web comprises a material of the glass fiber type associated with a thermoduric or thermoplastic resin.

14. The method according to claim 1, wherein before step C, a surface of the de-icing assembly is cut such that a maximum gap between the de-icing assembly and the inner skin is in the vicinity of 1.7 mm.

15. The method according to claim 1, wherein at the end of step B or C, a surface coating is applied on the de-icing assembly.

16. A turbojet engine nacelle including an element obtained using the method according to claim 1.

17. The nacelle according to claim 16, wherein the element is an air intake lip.

* * * * *